United States Patent
Frohman et al.

(10) Patent No.: US 9,692,751 B1
(45) Date of Patent: Jun. 27, 2017

(54) USER ACTUATED RELEASE OF A SECRET THROUGH AN AUDIO JACK TO AUTHENTICATE THE USER

(71) Applicant: EMC Corporation, Hopkinton, MA (US)

(72) Inventors: Robert T. Frohman, Hudson, NH (US); Michael J. O'Malley, Lowell, MA (US); Christopher W. Duane, Groton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 142 days.

(21) Appl. No.: 14/500,050

(22) Filed: Sep. 29, 2014

(51) Int. Cl.
*H04L 29/06* (2006.01)

(52) U.S. Cl.
CPC .............................. *H04L 63/0838* (2013.01)

(58) Field of Classification Search
CPC ................................................. H04L 63/0838
USPC ............................................................ 726/7
See application file for complete search history.

(56) References Cited

U.S. PATENT DOCUMENTS

| | | | |
|---|---|---|---|
| 8,774,410 B1 * | 7/2014 | Juels | H04L 9/085 380/270 |
| 8,874,904 B1 | 10/2014 | Juels et al. | |
| 8,875,263 B1 * | 10/2014 | van Dijk | G06F 21/31 709/225 |
| 8,904,482 B1 | 12/2014 | Dotan et al. | |
| 9,043,605 B1 | 5/2015 | Machani | |
| 9,130,753 B1 | 9/2015 | Kronrod et al. | |
| 2013/0085944 A1 * | 4/2013 | Fielder | G06Q 20/206 705/67 |

\* cited by examiner

*Primary Examiner* — Hadi Armouche
*Assistant Examiner* — Angela Holmes
(74) *Attorney, Agent, or Firm* — BainwoodHuang

(57) ABSTRACT

A technique provides a secret to authenticate a user. The technique involves storing, by processing circuitry, an initial secret in local memory. The technique further involves receiving, by the processing circuitry, a release command after the initial secret is stored in the local memory. The technique further involves, in response to the release command and based on the initial secret, outputting a released secret through an audio jack which is coupled to the processing circuitry. With such a technique, the secret is only exposed in response to user actuation thus providing improved security against an attacker vis-à-vis a conventional authentication token which constantly generates and outputs a series of one-time use passcodes (OTPs) on a display based on a seed stored in memory.

16 Claims, 5 Drawing Sheets

USER ACTUATED RELEASE OF A SECRET THROUGH AN AUDIO JACK TO AUTHENTICATE THE USER

BACKGROUND

A conventional authentication token is an electronic device which creates a series of one-time use passcodes (OTPs) for use in authenticating a user to an authentication entity. To authenticate to the authentication entity, the user visually reads a current OTP from the authentication token, and provides the current OTP to the authentication entity. Such activity proves to the authentication entity that the user (i.e., the source of the OTP) is currently in physical possession of the authentication token.

The conventional authentication token includes a programmed microprocessor, memory, and a display. During operation, the programmed microprocessor constantly generates and outputs the series of OTPs on the display based on a seed (or cryptographic key) which is stored in the memory.

SUMMARY

Unfortunately, there are deficiencies to the above-described conventional authentication token which constantly generates and outputs a series of OTPs on a display based on a seed stored in memory. For example, the conventional authentication token is susceptible to "over the shoulder" attacks in which a bystander captures one or more of the displayed OTPs and then derives the seed from the displayed OTPs. Once the bystander derives the seed, security is compromised because the bystander now has the ability to generate new OTPs from the seed.

Additionally, by design, the conventional authentication token continuously accesses the seed. Accordingly, if the authentication token falls into the hands of an attacker, the attacker can perform differential power analysis while the authentication token repeatedly accesses the seed and thus can discover the seed.

Furthermore, suppose that the conventional authentication token is designed to plug into a user device (e.g., a desktop computer) via an electronic communications port (e.g., a USB connector). In such a situation, the seed and any generated OTP values are vulnerable because these values could be accessed by the user device without the user's knowledge (e.g., by malware running on the user device).

Moreover, suppose that the conventional authentication token takes the form of a software token running on a host device of the user. In this situation, the software token can be hacked (e.g., via an offline attack), cloned without permission (e.g., copied), accessed via its application programming interface (API), and so on.

Also, the particular form factor of the conventional authentication token may limit the authentication token's applicability. For example, if the conventional authentication token is provisioned with a USB connector, the authentication token may be able to operate with a desktop or laptop computer having a complementary USB connector, but there are many devices which are not provisioned to communicate via USB (e.g., tablets, smartphones, etc.). Additionally, if the conventional authentication token is provisioned with wireless access (e.g., Bluetooth), there is currently no way for the conventional authentication token to interface with certain useful devices such as point of sale (POS) and automated teller machine (ATM) devices. Furthermore, in connection with wireless access, the security of the conventional authentication token could be compromised via the over-the-air protocol without the user's knowledge.

In contrast to the above-described conventional authentication token which constantly generates and outputs a series of OTPs on a display based on a seed stored in memory, improved techniques are directed to user actuated release of a secret through an audio jack to authenticate the user. For example, a user can carry a small attachable device equipped with an audio jack to allow the user to plug the small attachable device into a larger device (e.g., a mobile device, a computer, a POS device, an ATM machine, etc.). The small attachable device operates as a source of a secret which is released to the larger device only upon user actuation (e.g., in response to a button press by the user). Such techniques enable the user to deliver the secret to a larger device operating as an authentication token, and allows the larger device to rely on the small attachable device for non-volatile storage of the secret. Accordingly, there is no risk that an attacker will be able to steal the secret from the larger device if the larger device is lost or stolen. In some arrangements, the small attachable device is itself an authentication token which delivers passcodes such as OTPs through the audio jack.

One embodiment is directed to a method of providing a secret to authenticate a user. The method includes storing, by processing circuitry, an initial secret (e.g., a cryptographic key) in local memory. The method further includes receiving, by the processing circuitry, a release command after the initial secret is stored in the local memory. The method further includes, in response to the release command and based on the initial secret, outputting a released secret (e.g., a portion of the cryptographic key, a current OTP, etc.) through an audio jack which is coupled to the processing circuitry. With such an embodiment, the secret is only exposed in response to user actuation thus providing improved security against an attacker vis-à-vis a conventional authentication token which constantly generates and outputs a series of OTPs on a display based on a seed stored in memory.

In some arrangements, the audio jack is a physical phone connector (e.g., a male cylindrical plug with two, three or four contacts). In these arrangements, outputting the released secret includes electronically sending the released secret to an external client device through the physical phone connector.

In some arrangements, the external client device includes a power source. In these arrangements, the method further includes receiving power from the power source of the external client device through the physical phone connector. The received power is later used by the processing circuitry to electronically send the released secret to the external client device through the physical phone connector.

In some arrangements, storing the initial secret in the local memory includes receiving the initial secret from an external secret deployment device through the physical phone connector and loading the received initial secret into the local memory. Such activity may occur during initial configuration and/or activation of the processing circuitry.

In some arrangements, electronically sending the released secret includes transmitting, as the released secret, at least a portion of the initial secret to the external client device through the physical phone connector.

In some arrangements, the external client device includes authentication token circuitry. In these arrangements, transmitting includes providing the released secret to the authentication token circuitry to provision the authentication token circuitry for passcode derivation using the released secret as an input parameter.

In some arrangements, the initial secret includes a first secret share. Additionally, the external client device includes authentication token circuitry which stores a second secret share. In these arrangements, transmitting includes providing the first secret share to the authentication token circuitry of the external client device through the physical phone connector to provision the authentication token circuitry for passcode derivation using the first and second secret shares as input parameters.

In some arrangements, electronically sending the released secret to the external client device through the physical phone connector includes deriving a one-time use passcode (OTP) based on the initial secret. Additionally, sending the released secret includes outputting, as the released secret, the OTP to the external client device through the physical phone connector.

In some arrangements, the processing circuitry resides in a housing which is separate from the external client device. In these arrangements, the processing circuitry is coupled to a physical button which is supported by the housing. Here, receiving the release command includes receiving a button press signal from the physical button in response to user actuation of the physical button. The button press signal directs the processing circuitry to derive the OTP and output the OTP to the external client device through the physical phone connector.

In some arrangements, the method further includes supplying additional information to the external client device through the physical phone connector. Along these lines, such additional information can be supplied automatically with each button press. Alternatively, the user can control which information is supplied (e.g., certain instructions and/or status) based on the way the user presses the button (e.g., based on the number of times the user presses the button, based on how long the user presses the button, based on a particular button press pattern, and so on).

In some arrangements, supplying the additional information includes providing, by the processing circuitry, a launch command to the external client device through the physical phone connector. The launch command directs the external client device to launch an authentication application which is constructed and arranged to receive the released secret from the processing circuitry for user authentication.

Another embodiment is directed to an electronic apparatus to provide a secret to authenticate a user. The electronic apparatus includes an audio jack, memory, and control circuitry coupled to the audio jack and the memory. The memory stores instructions which, when carried out by the control circuitry, cause the control circuitry to:
 (A) store an initial secret in the memory,
 (B) after the initial secret is stored in the memory, receive a release command, and
 (C) in response to the release command and based on the initial secret, output a released secret through the audio jack.

Yet another embodiment is directed to a computer program product having a non-transitory computer readable medium which stores a set of instructions to provide a secret to authenticate a user. The set of instructions, when carried out by computerized circuitry, cause the computerized circuitry to perform a method of:
 (A) storing an initial secret in local memory;
 (B) after the initial secret is stored in the local memory, receiving a release command; and (C) in response to the release command and based on the initial secret, outputting a released secret through an audio jack which is coupled to the computerized circuitry.

It should be understood that, in the cloud context, certain electronic circuitry can be formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in user actuated release of a secret through an audio jack to authenticate the user.

It should be understood that all embodiments, arrangements, and configurations which are described herein may be combined in all possible combinations with each other, except to the extent that such combinations have been explicitly excluded. Such modifications and enhancements are intended to belong to various embodiments of the disclosure.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to user actuated release of a secret through an audio jack to authenticate the user. Along these lines, a user can carry a small attachable device equipped with an audio jack to allow the user to plug the small attachable device into a larger device which is equipped with a comparable audio jack (e.g., a mobile device, a computer, a POS device, an ATM machine, etc.). The small attachable device operates as a source of a secret which is released to the larger device only upon user actuation (e.g., in response to a button press by the user). Such a technique enables the user to control delivery of the secret to a larger device operating as an authentication token or as an authentication client, and allows the larger device to rely on the small attachable device for non-volatile storage of the secret. As a result, with the small attachable device being separate from the larger device, there is no risk that an attacker will be able to steal the secret from the larger device if the larger device is lost by or stolen from the user.

Figure 1:
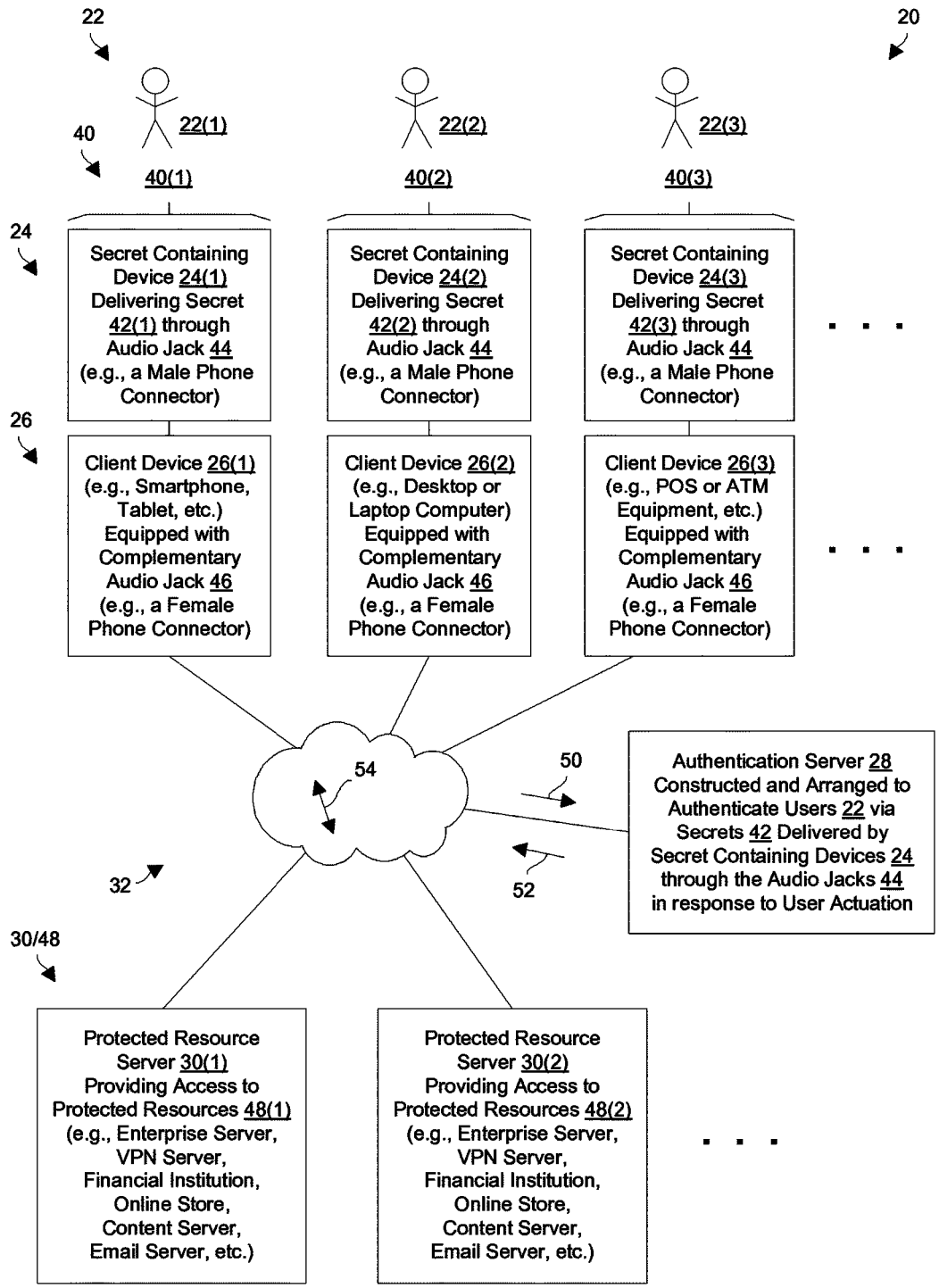
FIG. 1 is a block diagram of an electronic environment which utilizes user actuated release of a secret through an audio jack to authenticate the user.

FIG. 1 shows an electronic environment 20 which utilizes user actuated release of secrets through audio jacks to authenticate users 22. The electronic environment 20 includes secret containing devices 24, client devices 26, an authentication server 28, protected resource servers 30, and a communications medium 32.

Each user 22 controls a particular device pair 40 which includes a particular secret containing device 24 and a particular client device 26. For example, the user 22(1) controls device pair 40(1) which includes a secret containing device 24(1) and a client device 26(1). Similarly, the user 22(2) controls device pair 40(2) which includes a secret containing device 24(2) and a client device 26(2). Likewise, the user 22(3) controls device pair 40(3) which includes a secret containing device 24(3) and a client device 26(3), and so on.

Each secret containing device 24 is constructed and arranged to operate as a source of a secret 42 on behalf of a particular user 22 and to remain in possession of that user 22 (e.g., a secret 42(1) for the user 22(1), a secret 42(2) for the user 22(2), a secret 42(3) for the user 22(3), etc.). Each secret containing device 24 is further constructed and arranged to release that secret 42 through an audio jack 44 (e.g., a physical male phone connector) in response to user activation (e.g., a physical button press, a user command, etc.).

Each client device 26 is constructed and arranged to authenticate a particular user 22 to the authentication server 28 using a secret 42 received from a secret containing device 24 through a complementary audio jack 46 (e.g., a physical female phone connector to complement a male phone connector 44 of a secret containing device 24). Furthermore, once that client device 26 has successfully authenticated the user 22 to the authentication server 28, that client device 26 is constructed and arranged to provide the user 22 with access to one or more protected resources 48.

At this point, it should be understood that the combination of the secret containing device 24 and the client device 26 of each device pair 40 serves as an authentication token to provide one-time use passcodes (OTPs) to authenticate a user 22. However, in contrast to conventional authentication tokens which constantly access seeds as well as generate and output OTPs on displays (i.e., potential security weak points), the secrets 42 used by the device pairs 40 are only released through audio jacks 44 in response to user actuation and thus provide improved security (e.g., minimal secret exposure).

The authentication server 28 is constructed and arranged to authenticate users 22 via the secrets 42 delivered by the secret containing devices 24 through the audio jacks 44 in response to user actuation. In particular, the authentication server 28 receives requests 50 to authenticate the users 22, and performs authentication operations resulting in authentication results 52 in response to the requests 50. To authenticate a user 22 in response to an authentication request 50, the authentication server 28 evaluates a current OTP from that user 22. Along these lines, the authentication server 28 compares the current OTP from that user 22 to an expected OTP for that user 22. If the current OTP and the expected OTP matches, the authentication server 28 outputs an authentication result 52 indicating that authentication of the user 22 is successful, i.e., the authentication server 28 considers the user 22 to be authentic. However, if the current OTP and the expected OTP do not match, the authentication server 28 outputs an authentication result 52 indicating that authentication of the user 22 is unsuccessful.

Each protected resource server 30 is constructed and arranged to provide secure access to one or more protected resources 48. Examples of suitable protected resources 48 include, among others things, login access to accounts and databases of enterprises, access to VPNs/gateways/other networks, login and transaction access with banks/brokerages/other financial institutions, login and transaction access to online stores, access to remote databases containing movies/music/files/other content, access to email, access to online games, and so on.

In some arrangements, each protected resource server 30 is operated by a different entity. Along these lines, the protected resource server 30(1) may be operated by a financial institution. In contrast, the protected resource server 30(2) may be operated by an online retailer which is different than the financial institution, and so on. In these arrangements, the authentication server 28 may be operated by yet a different entity such as a trusted third-party having respective trusted relationships with the other entities.

The communications medium 32 is constructed and arranged to connect the various components of the electronic environment 20 together to enable these components to exchange electronic signals 54 (e.g., see the double arrow 54). At least a portion of the communications medium 32 is illustrated as a cloud to indicate that the communications medium 32 is capable of having a variety of different topologies including backbone, hub-and-spoke, loop, irregular, combinations thereof, and so on. Along these lines, the communications medium 32 may include copper-based data communications devices and cabling, fiber optic devices and cabling, wireless devices, combinations thereof, etc. Furthermore, the communications medium 32 is capable of supporting LAN-based communications, SAN-based communications, cellular communications, combinations thereof, etc.

During operation, the authentication server 28 is capable of receiving authentication requests 50 directly from a client device 26 of a device pair 40. For example, the user 22 in control of the device pair 40 may wish to access a protected resource 48 which locally resides on the client device 26 (e.g., access to a file, access to a particular application, access to a contact list or other protected content, login access, phone call access, camera access, etc.). Suitable local protected resources 48 include general user access (e.g., unlocking the client device 26), access to locally stored content (e.g., documents, a database, a contacts list, confidential information, access to certain applications, games, photos, music, movies), and access to other resources (e.g., network access, phone access, system privileges, access to specialized hardware and peripherals), and so on.

In such a situation, the authentication server 28 obtains a user identifier which uniquely identifies the user 22 and a current OTP. These items of information may be contained within an authentication request 50 from the client device 26 or separately received from the client device 26 after an authentication session is established between the authentication server 28 and the client device 26 in response to the authentication request 50. If the current OTP matches an expected OTP for that user 22 (e.g., based on the user identifier), the authentication server 28 returns an authentication result 52 to the client device 26 indicating successful authentication which enables the user 22 to access the local protected resource 48 (i.e., the user 22 is deemed authentic). However, if the current OTP does not match the expected OTP for that user 22, the authentication server 28 returns an authentication result 52 to the client device 26 indicating unsuccessful authentication which denies the user 22 access the local protected resource 48.

Additionally, the authentication server 28 is capable of receiving authentication requests 50 via the protected resource servers 30. Here, a user 22 in control of a device pair 40 may wish to access a protected resource 48 which remotely resides on a particular protected resource server 30. During an exchange between the protected resource server 30 and the client device 26 of the device pair 40 (e.g., a web-based exchange), the protected resource server 30 gathers a user identifier which uniquely identifies the user 22 and a current OTP from the client device. The protected resource server 30 then sends these items of information to the authentication server 28 (e.g., an authentication request 50) and awaits an authentication response (e.g., an authentication result 52) from the authentication server 28 indicating whether the user 22 has successfully authenticated. If authentication is successful, the protected resource server 30 grants the user 22 with access to the protected resource 48. However, if authentication is unsuccessful, the protected resource server 30 denies access to the user 22.

Other authentication situations are available as well. For example, a user 22 is capable of directing the client device 26 of a device pair 40 to communicate with a protected resource server 30 to access a remote protected resource 48. The protected resource server 30 can then redirect the client device 26 to the authentication server 28 to enable the client device 26 and the authentication server 28 to communicate directly to authenticate the user 22.

It should be understood that, in some arrangements, unsuccessful authentication not only results in denial of access to the protected resource 48, but also results in one or more remedial activities. Such remedial activities include sending a notification or alarm (e.g., a failure message to the user 22, a warning to a server administrator, etc.), locking out the user 22 after a set number of failed attempts to authenticate, re-authentication, step up authentication, and so on.

As mentioned earlier, the combination of the secret containing device 24 and the client device 26 of each device pair 40 operates as an authentication token to provide OTPs to authenticate a particular user 22. It should be understood that, in some arrangements, the secret containing device 24 supplies the secret 44 to the client device 26 in response to user actuation (e.g., a button press from the user 22), and the client device 26 derives OTPs from the secret 44 (e.g., the client device 26 uses the secret 44 as a seed which is input to a cryptographic algorithm or cipher to generate OTPs). In other arrangements, the secret containing device 24 supplies, as secrets 42, OTPs and the client device 26 conveys the OTPs with additional information (e.g., a user identifier, other authentication artifacts, etc.) to the authentication server 28 for user authentication. Further details will now be provided with reference to FIG. 2.

Figure 2:
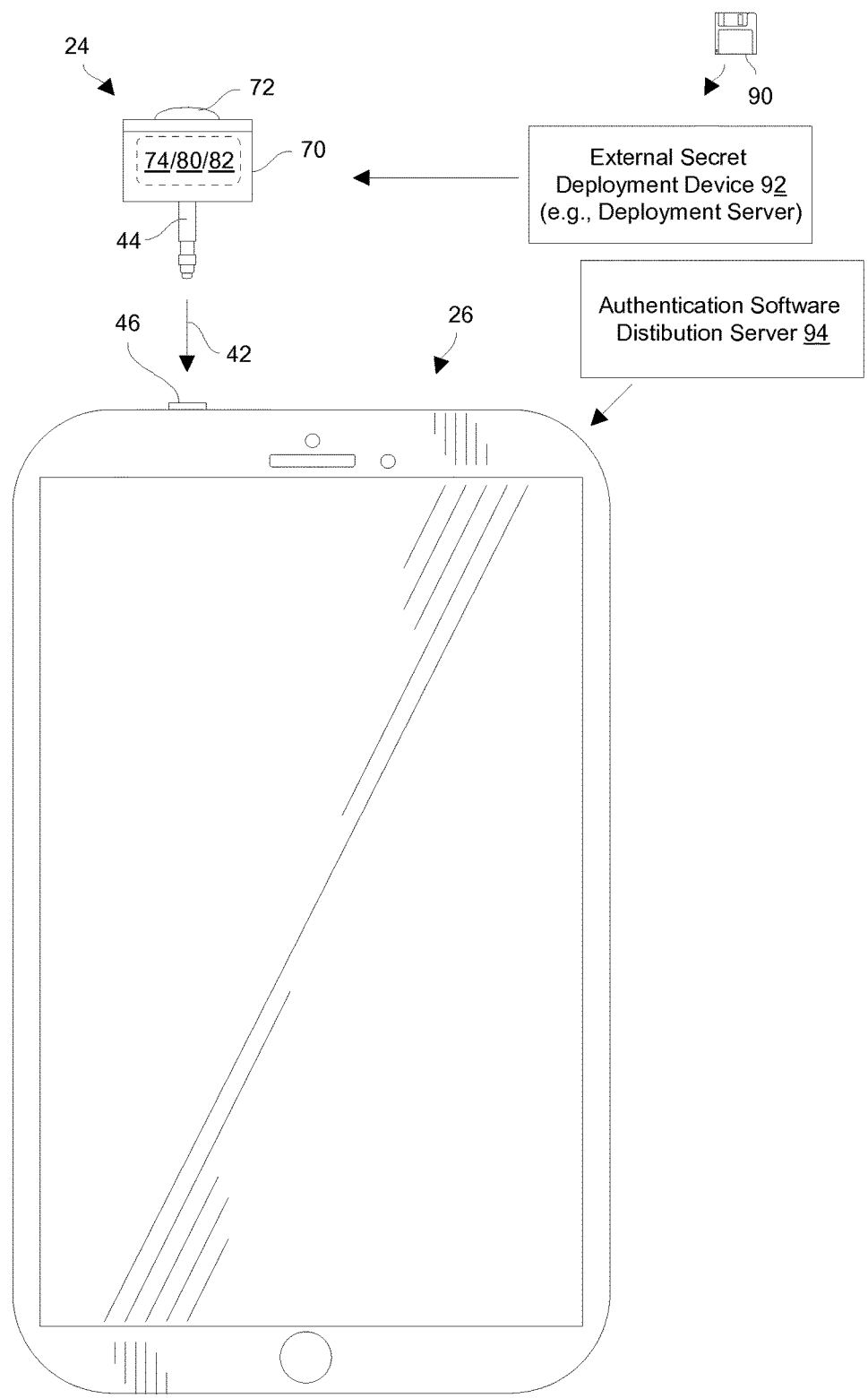
FIG. 2 is a perspective view of an example arrangement of devices for a user of the electronic environment of FIG. 1.

FIG. 2 shows a perspective view of an example secret containing device 24 and an example client device 26. Recall that the combination of the secret containing device 24 and the client device 26 of each device pair 40 operates as an authentication token (or authenticator) to provide one-time use passcodes (OTPs) to authenticate a particular user 22.

The example secret containing device 24 includes a housing 70, a button 72, internal circuitry 74, and an audio jack 44. Although the example secret containing device 24 is illustrated as a smaller attachable device to a larger smartphone, other dimensions, shapes, sizes, etc. are suitable for use as well.

The housing 70 of the secret containing device 24 is constructed and arranged to protect the internal circuitry 74 of the secret containing device 24. Additionally, the housing 70 provides structural support for certain components such as the button 72 and the audio jack 44. In some arrangements, the form factor of the housing 70 is relatively small compared to that of the larger client device 26 to facilitate portability and ease of handling (e.g., smaller than a smartphone, pocket-sized, the size of a coin, the size of a pen cap, etc.). In particular compact arrangements, the housing 70 is barely larger than the button 72 itself.

The button 72 of the secret containing device 24 is constructed and arranged to receive user actuation from a user 22 (also see FIG. 1). In some arrangements, the button 72 is a physical push-button or switch apparatus which outputs a button signal to the internal circuitry 74 (e.g., on/off, depressed/not-depressed, etc.). In other arrangements, the button 72 is a touch sensor which outputs a button signal indicating whether the button 72 detects physical contact (e.g., contact with a human finger). As will be explained shortly, the internal circuitry 74 processes the button signal as a command to release a secret 42 (also see FIG. 1) through the audio jack 44.

The internal circuitry 74 of the secret containing device 24 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In some arrangements, the internal circuitry 74 includes memory 80 and processing circuitry 82. The memory 80 stores a set of software constructs (e.g., a cryptographic key and a set of applications and data) which is managed by the processing circuitry 82. It should be understood that the secret containing device 24 may include other types of circuitry and components as well such as a power supply (or temporary power source), power conditioning circuitry, an LED to indicate activity or operation, and so on.

The audio jack 44 of the secret containing device 24 is constructed and arranged to operate as an input/output (I/O) port thus enabling the internal circuitry 74 to communicate with external devices. In some arrangements, the audio jack 44 of the secret containing device 24 is a physical phone connector (e.g., a male cylindrical phone plug with two, three or four contacts). In these arrangements, the complementary audio jack 46 of the client device 26 is the reciprocal physical phone connector (e.g., a female cylindrical phone plug). Such arrangements enable the user 22 to connect the secret containing device 24 to the client device 26 by inserting the audio jack 44 into the complementary audio jack 46.

Once the audio jacks 44, 46 are mated (or engaged) with each other, the smaller secret containing device 24 is essentially an extension of the larger client device 26 from the user's perspective (e.g., the secret containing device 24 appears as a peripheral component of the client device 26). At this point, the client device 26 is capable of receiving electronic signals from the secret containing device 24.

In the context of one or more processors executing software, a computer program product 90 is capable of delivering all or portions of the software to the secret containing device 24 (e.g., through the audio jack 44). Along these lines, the computer program product 90 can initially transfer the software to an external secret deployment device 92 such as a deployment server at a manufacturing facility or a deployment site which then loads the software into the memory 80 of the secret containing device 24 (e.g., through the audio jack 44). The computer program product 90 has a non-transitory and non-volatile computer readable medium which stores a set of instructions to control one or more operations of the secret containing device 24. Examples of suitable computer readable storage media include tangible articles of manufacture and apparatus which store instructions in a non-volatile manner such as CD-ROM, flash memory, disk memory, tape memory, and the like.

Likewise, the client device 26 can receive client authentication software from an authentication software distribution server 94. Such software may originate from another or the same computer program product 90. With the client authentication software in place, the client device 26 is appropriately configured to receive the secret 42 from the secret containing device 24, and carry out an exchange with the authentication server 28 (FIG. 1) to authenticate the user 22. Further details on this authentication process will now be provided with reference to FIGS. 3 and 4.

Figure 3:
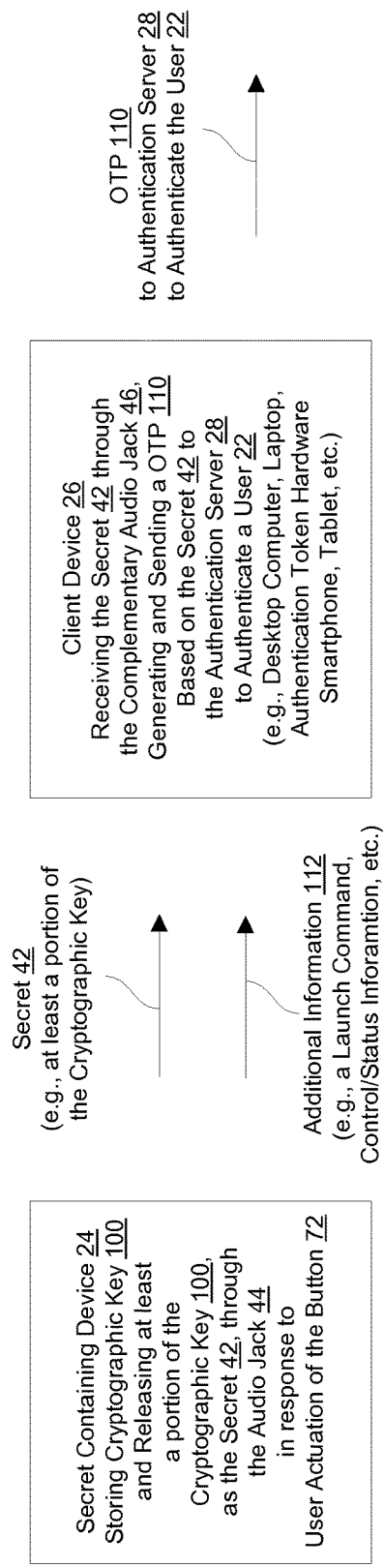
FIG. 3 is a block diagram of a pair of devices of the electronic environment of FIG. 1 during one-time passcode generation.
Figure 4:
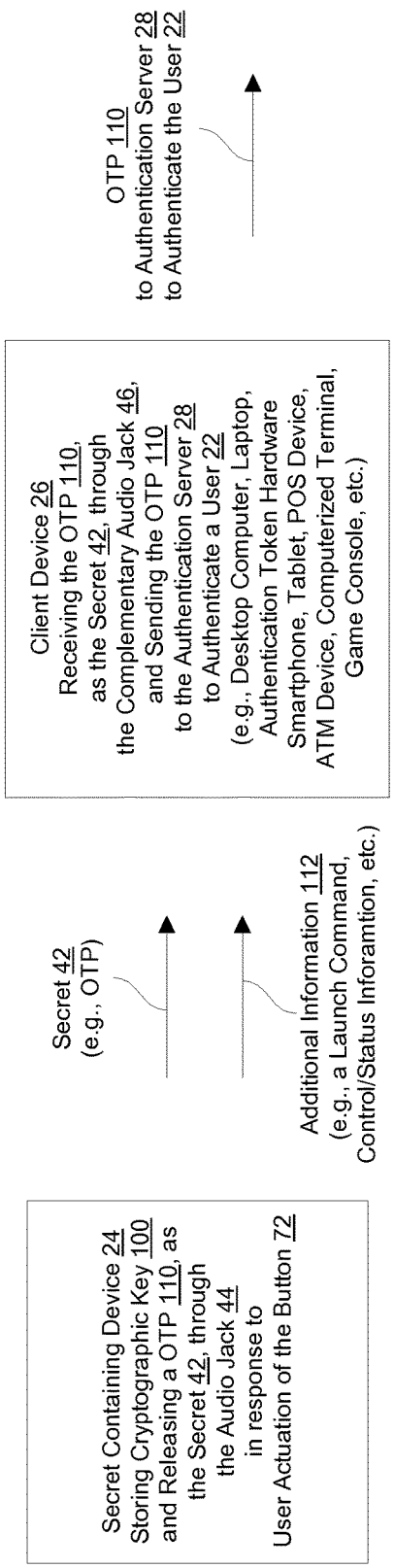
FIG. 4 is a block diagram of an alternative pair of devices of the electronic environment of FIG. 1 during one-time passcode generation.

FIGS. 3 and 4 show different scenarios for authenticating a user 22 using a device pair 40 which includes a secret containing device 24 and a client device 26. In connection with these scenarios, it should be understood that the secret containing device 24 is provisioned with a cryptographic key 100 (e.g., loaded into the memory 80 of the secret containing device 24 prior to deployment of the secret containing device 24 to the user 22). FIG. 3 shows a secret containing device 24 delivering a secret 42 to a client device 26 which, in turn, generates and sends a OTP 110 to the authentication server 28 for user authentication. In contrast, FIG. 4 shows a secret containing device 24 generating a OTP 110 and then delivering the OTP 110, as the secret 42, to a client device 26 for conveyance to the authentication server 28 for user authentication.

A variety of examples will now be provided in connection with FIGS. 3 and 4. It should be understood that other examples are available as well.

EXAMPLE 1

With reference to FIG. 3, suppose that both the secret containing device 24 and the client device 26 normally are in constant possession of the user 22. Along these lines, the client device 26 may take the form of a desktop computer, a laptop computer, a smartphone, a tablet, or other computerized device of the user 22. In some arrangements, the client device 26 takes the form of dedicated authentication token hardware (e.g., a credit card sized hardware authenticator) which is issued to the user 22 by a trusted third-party.

Now, suppose that the user 22 wishes to access a protected resource 48 using the client device 26 either on a protected resource server 30 (also see FIG. 1) or perhaps a protected resource 48 within the client device 26 itself. To obtain such access, the user 22 is required to successfully authenticate with the authentication server 28.

To this end, the user 22 physically connects the secret containing device 24 and the client device 26 together. In particular, the user 22 engages the audio jack 44 of the secret containing device 24 with the complementary audio jack 46 of the client device 26 (also see FIG. 2). At this point, the combination of the secret containing device 24 and the client device 26 serves as an authentication token to provide OTPs to authenticate the user 22. However, the secret 42 remains protected within the secret containing device 24 and is not yet accessible by the client device 26.

With the secret containing device 24 connected to the client device 26, the user 22 operates the client device 26 to establish an authentication session with the authentication server 28 to authenticate. Along these lines, by operating a user interface of the client device 26 (e.g., a touch screen of a smartphone), the user 22 starts an application on the client device 26 which results in an electronic exchange between the client device 26 and the authentication server 28. The application may take the form of specialized software or a standard browsing application (or app). As the client device 26 runs the application, the client device 26 may communicate directly with the authentication server 28 (e.g., via redirection of a web session after the user 22 initially navigates to a particular website) or indirectly with the authentication server 28 (e.g., via communications with a protected resource server 30 or other front-end server device).

At some point during the authentication session, the user 22 is required to deliver a current OTP 110 to the authentication server 28. For example, after the user 22 has provided a user identifier which uniquely identifies the user 22 to the authentication server 28, the authentication server 28 may prompt the user 22 to provide the current OTP 110.

In response, the user 22 actuates the button 72 of the secret containing device 24 which is connected to the client device 26 (also see FIG. 2). Such actuation of the button 72 serves as a release command which directs the secret containing device 24 to release the secret 42 to the client device 26 through the audio jack 44. In this example, the secret 42 may be the cryptographic key 100, or a portion of the cryptographic key 100.

Upon receipt of the secret 42 by the client device 26 through the complementary audio jack 46, the client device 26 generates the current OTP 110 based on the secret 42. Such operation may involve use of a cipher or other algorithm to derive the current OTP 110 from the secret 42 and perhaps other parameters (e.g., time, control/status information, etc.). Additionally, the client device 26 may include other authentication factors when sending the current OTP 110 such as biometrics, geolocation, etc.

The authentication server 28 (FIG. 1) then performs an authentication operation to authenticate the user 22. If the authentication result indicates that authentication is successful, the authentication server 28 outputs a positive authentication result 52 (FIG. 1) which grants access to the protected resource 48. However, if the authentication result indicates that authentication is unsuccessful, the authentication server 28 outputs a negative authentication result 52 (FIG. 1) which denies access to the protected resource 48 and may initiate some form of remedial activity.

At this point, it should be understood that the secret 42 is only exposed in response to user actuation thus providing improved security against an attacker vis-à-vis a conventional authentication token which constantly generates and outputs a series of OTPs on a display based on a seed stored in memory. Moreover, if the client device 26 is ever lost or stolen, the secret 42 remains securely protected within the secret containing device which remains in the hands of the user 22.

In some arrangements, the secret containing device 24 performs additional operations. For example, in some arrangements, the secret containing device 24 does not include a power source. Rather, the internal circuitry 74 of the secret containing device 24 is constructed and arranged to derive power from the client device 26 through the audio jack 44. Such an arrangement enables the secret containing device 24 to have a very small form factor and alleviates issues relating to power storage capacity, battery life, and so on.

Additionally, the secret containing device 24 can provide signals containing information 112 other than the secret 42 through the audio jack 42. In some arrangements, the secret containing device 24 provides a launch command prior to releasing the secret 42, and the client device 26 is configured to automatically respond to the launch command by launching an application which establishes an authentication session with the authentication server 28. Accordingly, the user 22 initiates the authentication session and delivery of the secret 42 by simply actuating the button 72 of the secret containing device 24.

In another arrangement, the user 22 enters a particular button actuation pattern (e.g., three quick button presses, holding down the button 72 for a set period of time, etc.) to direct the secret containing device 24 to provide certain data (e.g., control/status information) through the audio jack 44. Such data can then be conveyed by the client device 26 to another device such as the authentication server 28 for analysis/evaluation, e.g., error detection, operational status, tamper monitoring, and so on.

In some arrangements, the secret 42 provided by the secret containing device 24 through the audio jack 44 is a secret share which, along with another secret share stored within the client device 26, are used to derive the current OTP 110. That is, the client device 26 operates as a host which combines its own secret with the secret 42 obtained from the secret containing device 24 before generating the current OTP 110. Such arrangements require availability/presence of both the particular secret containing device 24 as well as the particular client device 26 in order to properly generate the current OTP 110.

EXAMPLE 2

With reference to FIG. 4, again suppose that both the secret containing device 24 and the client device 26 normally are in constant possession of the user 22. Along these lines, the client device 26 may take the form of a desktop computer, a laptop computer, a smartphone, a tablet, or other computerized device of the user 22.

Additionally, suppose that the user 22 wishes to access a protected resource 48 using the client device 26 either on a protected resource server 30 (also see FIG. 1) or perhaps even within the client device 26 itself. To obtain such access, the user 22 is required to successfully authenticate with the authentication server 28.

Here, the user 22 physically connects the secret containing device 24 and the client device 26 together. Along these lines, the user 22 engages the audio jack 44 of the secret containing device 24 with the complementary audio jack 46 of the client device 26 (also see FIG. 2). The secret 42 remains protected within the secret contain device 24 and is not yet accessible by the client device 26.

With the secret containing device 24 connected to the client device 26, the user 22 operates the client device 26 to establish an authentication session with the authentication server 28 to authenticate. Along these lines, by operating a user interface of the client device 26, the user 22 starts an application on the client device 26 which results in an electronic exchange between the client device 26 and the authentication server 28. The application may take the form of specialized software or a standard browsing application (or app). As the client device 26 runs the application, the client device 26 may communicate directly with the authentication server 28 (e.g., via redirection of a web session after the user 22 initially navigates to a particular website) or indirectly with the authentication server 28 (e.g., via communications with a protected resource server 30 or other front-end server device).

At some point during the authentication session, the user 22 is required to deliver a current OTP 110 to the authentication server 28. For example, after the user 22 has provided a user identifier which uniquely identifies the user 22 to the authentication server 28, the authentication server 28 may prompt the user 22 to provide the current OTP 110.

In response, the user 22 actuates the button 72 of the secret containing device 24 which is connected to the client device 26. Such actuation of the button 72 serves as a release command which directs the secret containing device 24 to release the secret 42 to the client device 26 through the audio jack 44. Next, the secret containing device 24 internally generates the current OTP 110 based on the internally stored cryptographic key 100 and outputs the current OTP to the client device 26 through the audio jack 44. Such operation may involve use of a cipher or other algorithm by the internal circuitry 74 of the secret containing device 24 (also see FIG. 2) to derive the current OTP 110. Furthermore, such operation may involve other input parameters in addition to the cryptographic key 100 such as time, biometrics (e.g., some buttons 72 may also operate as sensors such as fingerprint scanners), and so on.

Upon receipt of the current OTP 110 (i.e., the secret 42) by the client device 26 through the complementary audio jack 46, the client device 26 conveys the current OTP 110 to the authentication server 28 to authenticate the user 22. As in Example 1, the client device 26 may include other authentication factors when sending the current OTP 110 such as biometrics, geolocation, etc.

The authentication server 28 then performs an authentication operation to authenticate the user 22. If the authentication result indicates that authentication is successful, the authentication server 28 grants access to the protected resource 48. However, if the authentication result indicates that authentication is unsuccessful, the authentication server 28 denies access to the protected resource 48 and may initiate some form of remedial activity.

At this point, it should be understood that the cryptographic key 100 is never exposed outside the secret containing device 24 in this example. Moreover, if the client device 26 is ever lost or stolen, the cryptographic key 100 and the ability to generate OTPs 110 remains securely protected within the secret containing device 24 in the hands of the user 22.

Essentially, the secret containing device 24 operates as a fully functioning authentication token except that the secret containing device 24 utilizes the client device 26 to establish communications with the authentication server 28 and to deliver the OTP 110 to the authentication server 28. Furthermore, since there is no need to display the OTP 110, the OTP 110 can include non-displayable characters, more digits, etc. thus increasing entropy and security strength.

It should be understood that some of the arrangements described above in connection with Example 1 are also available in this Example 2. For instance, the secret containing device 24 can derive power from the client device 26 through the audio jack 44 thus alleviating the need for the secret containing device 24 to possess its own power source and enabling the secret containing device 24 to enjoy a smaller form factor without any battery life issues.

Additionally, the secret containing device 24 can provide signals containing information 112 other than the secret 42 through the audio jack 42 (e.g., an application launch command, control, status, biometrics, etc.), and so on. In some arrangements, such information 112 is passed from the internal circuitry 74 through the audio jack 42 automatically in response to each button press. Furthermore, in some arrangements, particular types of information 112 (e.g., different commands and/or data) are passed based on how the user operates the button 72, e.g., based on the number of button presses, based on how long the user holds down the button 72, based on a particular button press pattern, and so on.

EXAMPLE 3

Again with reference to FIG. 4, suppose that the secret containing device 24 is normally in constant possession of the user 22. However, further suppose that the client device 26 is normally not in possession of the user 22. For example, the client device 26 may be a point of sale (POS) device, an automated teller machine (ATM) device, a computerized terminal, a game console, and so on. Such devices are often already equipped with female phone plugs to deliver voice or other sound information. In these situations, the secret containing device 24 is able to securely deliver the secret 42 in the reverse direction into a female phone plug via the audio jack 44 in response to user actuation in order to authenticate the user 22.

To this end, suppose that the user 22 wishes to access a protected resource 48 using the client device 26 either on a protected resource server 30 (also see FIG. 1) or perhaps even within the client device 26 itself. Along these lines, the user 22 may need to authenticate to complete a transaction or purchase, to withdraw funds, to play an electronic game, and so on. To obtain such access, the user 22 is required to successfully authenticate with the authentication server 28.

Here, the user 22 physically connects the secret containing device 24 and the client device 26 together. Along these lines, the user 22 engages the audio jack 44 of the secret containing device 24 with the complementary audio jack 46 of the client device 26 (also see FIG. 2). The secret 42 remains protected within the secret contain device 24 and is not yet accessible by the client device 26.

With the secret containing device 24 connected to the client device 26, the user 22 operates the client device 26 to establish an authentication session with the authentication server 28 to authenticate. Along these lines, by operating a user interface of the client device 26, the user 22 engages in an electronic exchange with the client device 26 which ultimately communicates with the authentication server 28.

At some point during the authentication session, the user 22 is required to deliver a current OTP 110 to the authentication server 28. For example, after the user 22 has provided a user identifier which uniquely identifies the user 22 to the authentication server 28, the authentication server 28 may prompt the user 22 to provide the current OTP 110.

In response, the user 22 actuates the button 72 of the secret containing device 24 which is connected to the client device 26. Such actuation of the button 72 serves as a release command which directs the secret containing device 24 to release the secret 42 to the client device 26 through the audio jack 44. Accordingly, the secret containing device 24 internally generates the current OTP 110 based on the internally stored cryptographic key 100 and outputs the current OTP to the client device 26 through the audio jack 44. Such operation may involve use of a cipher or algorithm by the internal circuitry 74 of the secret containing device 24 (also see FIG. 2) to derive the current OTP 110. Furthermore, such operation may involve other input parameters in addition to the cryptographic key 100 such as time, biometrics (e.g., some buttons may also operate as sensors such as fingerprint scanners), and so on.

Upon receipt of the secret 42 by the client device 26 through the complementary audio jack 46, the client device 26 conveys the current OTP 110 to the authentication server 28 to authenticate the user 22. As in Examples 1 and 2, the client device 26 may include other authentication factors when sending the current OTP 110 such as biometrics, geolocation, etc.

The authentication server 28 then performs an authentication operation to authenticate the user 22. If the authentication result indicates that authentication is successful, the authentication server 28 grants access to the protected resource 48. However, if the authentication result indicates that authentication is unsuccessful, the authentication server 28 denies access to the protected resource 48 and may initiate some form of remedial activity.

At this point, it should be understood that the cryptographic key 100 is never exposed outside the secret containing device 24. Moreover, if the client device 26 is ever compromised, the cryptographic key 100 and the ability to generate OTPs 110 remains securely protected in the hands of the user 22.

Essentially, the secret containing device 24 operates as a fully functioning authentication token except that utilizes the client device 26 to establish communications with the authentication server 28 and to deliver the OTP 110 to the authentication server 28. Furthermore, since there is no need to display the OTP 110, the OTP 110 can include non-displayable characters, more digits, etc. thus increasing entropy and security strength.

It should be understood that some of the arrangements described above in connection with Example 1 are also available in this Example. For instance, the secret containing device 24 can derive power from the client device 26 through the audio jack 44 thus alleviating the need for the secret containing device 24 to possess its own power source and enabling the secret containing device 24 to enjoy a smaller form factor without any battery life issues. Additionally, the secret containing device 24 can provide signals containing information 112 other than the secret 42 through the audio jack 42 (e.g., an application launch command, control, status, biometrics, etc.), and so on.

In some arrangements, the secret containing device 24 is preconfigured to deliver a user identifier to automatically identify the user 22. As a result, the user 22 does not need to carry another item such as a credit card to provide a credit card number, an ATM card to provide an ATM card number, etc. Rather, the user simply carries the secret containing device 24 which supplies a user identifier. Accordingly, the user 22 simply engages the secret containing device 24 with a client device 26 (e.g., a POS device, an ATM device, etc.) as needed to provide both user identifying information and user authentication factors.

Further Details

Figure 5:
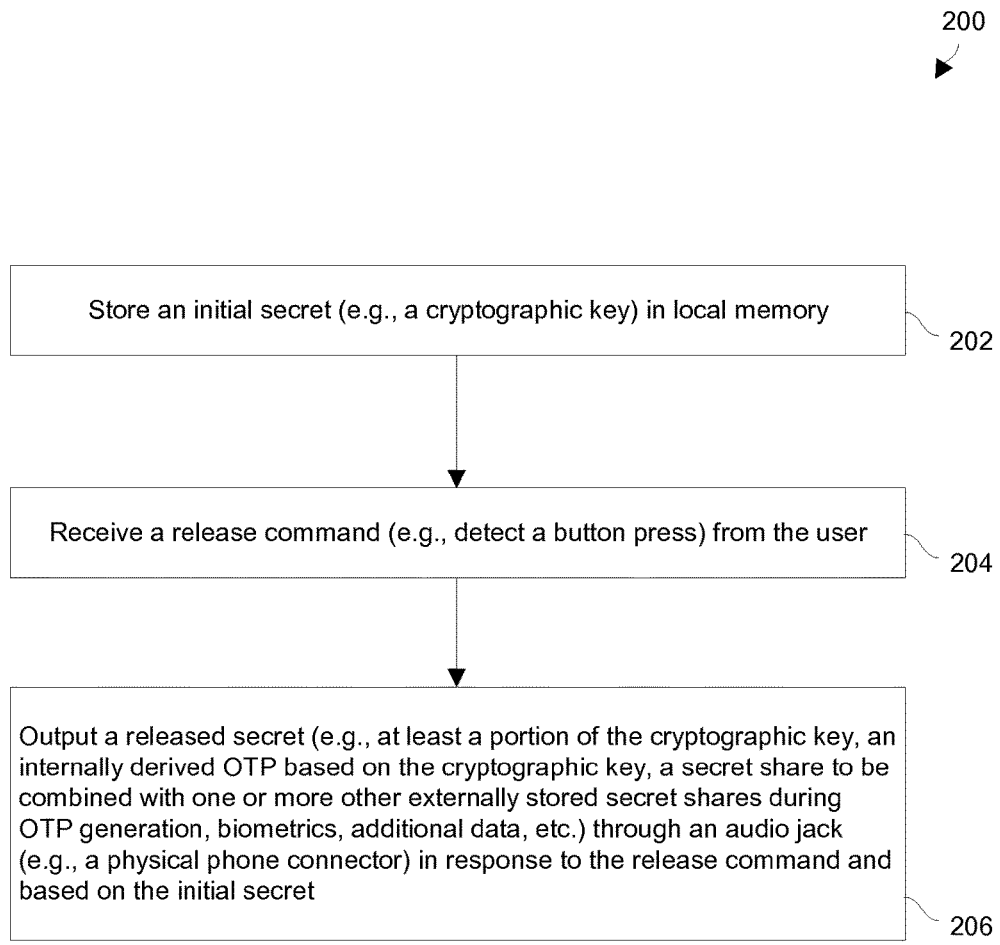
FIG. 5 is a flowchart of a procedure which is performed by a device of the electronic environment of FIG. 1.

FIG. 5 is a flowchart of a procedure 200 which is performed by the secret containing device 24 to provide a secret 42 to authenticate a user 22. As mentioned earlier, the secret 42 may take the form of a cryptographic key 100 or portion of the cryptographic key 100. Alternatively, the secret 42 may take the form of a current OTP 110 which is generated from a cryptographic key 100.

At 202, the secret containing device 24 stores an initial secret (i.e., a cryptographic key 100) in local memory. Recall that the secret containing device 24 is equipped with internal circuitry 74 which can be preloaded with the cryptographic key 100 prior to issuance to the user 22 (also see FIG. 2).

At 204, the secret containing device 24 receives a release command from the user 22. Along these lines, after the user 22 connects the secret containing device 24 to a client device 26 to form a device pair 40, the user 22 actuates a button 72 of the secret containing device 24 to provide the release command.

At 206, the secret containing device 24 outputs a released secret 42 through an audio jack 44 coupled to the internal circuitry 74 in response to the release command and based on the initial secret. It should be understood that the secret containing device 24 can output other signals in response to the release command before and after the released secret 42 such as a launch command, a user identifier, and so on before releasing the secret 42.

In some arrangements, the secret containing device 24 outputs at least a portion of the cryptographic key 100 as the released secret 42. In such arrangements, the client device 26 receiving the released secret 42 can then generate a OTP 110 and then send that OTP 110 to the authentication server 28 to authenticate the user 22.

In other arrangements, the secret containing device 24 generates a current OTP 110 based on the cryptographic key 100 and outputs the current OTP 110 as the released secret 42. In such arrangements, the client device 26 receiving the released secret 42 simply conveys the current OTP 110 perhaps with other information (e.g., transaction details, biometrics, control/status, etc. to the authentication server 28 to authenticate the user 22.

As described above, improved techniques are directed to user actuated release of a secret 42 through an audio jack 44 to authenticate the user 22. For example, a user 22 can carry a small attachable device equipped with an audio jack 44 to allow the user 22 to plug the small attachable device into a larger device (e.g., a mobile device, a computer, a POS device, an ATM machine, etc.). The small attachable device operates as a source of a secret 42 which is released to the larger device only upon user actuation (e.g., in response to a button press by the user). Such techniques enable the user to deliver the secret 42 to a larger device operating as an authentication token, and allows the larger device to rely on the small attachable device for non-volatile storage of the secret 42 or a cryptographic key 100 from which the secret 42 is derived. Accordingly, there is no risk that an attacker will be able to steal the secret 42 (or the cryptographic key 100) from the larger device if the larger device is lost or stolen. In some arrangements, the small attachable device is itself an authentication token which delivers passcodes such as OTPs through the audio jack.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that the client device 26 can perform local authentication (i.e., the authentication server 28 resides within the client device 26). Such an arrangement alleviates the need for an external remote authentication server 28 to participate in user authentication. Such modifications and enhancements are intended to belong to various embodiments of the disclosure.

What is claimed is:

1. A method of providing a secret to authenticate a user, the method comprising:
    storing, by processing circuitry, an initial secret in local memory;
    after the initial secret is stored in the local memory, receiving, by the processing circuitry, a release command; and
    in response to the release command and based on the initial secret, outputting, by the processing circuitry, a released secret through an audio jack which is coupled to the processing circuitry,
    wherein the processing circuitry resides in a housing from which the audio jack projects, the housing including a button coupled to the processing circuitry,
    wherein receiving the release command includes receiving, by the processing circuitry, a button press signal from the button in response to user actuation of the button, the button press signal directing the processing circuitry to output the released secret to an external client device over the audio jack, and
    wherein the processing circuitry, the audio jack, the housing, and the physical button are parts of an electronic apparatus, the electronic apparatus having no internal power source, and wherein the method further comprises:
        the electronic apparatus receiving power from the external client device over the audio jack when the audio jack is plugged into the external client device,
        wherein outputting the released secret is performed by the processing circuitry after the processing circuitry receives power from the external client device over the audio jack.

2. A method as in claim 1 wherein the audio jack is a physical phone connector; and wherein outputting the released secret includes:
    electronically sending the released secret to an external client device through the physical phone connector.

3. A method as in claim 2 wherein storing the initial secret in the local memory includes:
    receiving the initial secret from an external secret deployment device through the physical phone connector and loading the received initial secret into the local memory.

4. A method as in claim 2 wherein electronically sending the released secret includes:
    transmitting, as the released secret, at least a portion of the initial secret to the external client device through the physical phone connector.

5. A method as in claim 4 wherein the external client device includes authentication token circuitry; and wherein transmitting includes:

providing the released secret to the authentication token circuitry to provision the authentication token circuitry for passcode derivation using the released secret as an input parameter.

6. A method as in claim 4 wherein the initial secret includes a first secret share; wherein the external client device includes authentication token circuitry which stores a second secret share; and wherein transmitting includes:
providing the first secret share to the authentication token circuitry of the external client device through the physical phone connector to provision the authentication token circuitry for passcode derivation using the first and second secret shares as input parameters.

7. A method as in claim 2 wherein electronically sending the released secret to the external client device through the physical phone connector includes:
deriving a one-time use passcode (OTP) based on the initial secret, and
outputting, as the released secret, the OTP to the external client device through the physical phone connector.

8. A method as in claim 2, further comprising:
supplying, by the processing circuitry, additional information to the external client device through the physical phone connector.

9. A method as in claim 8 wherein supplying the additional information to the external client device through the physical phone connector includes:
providing, by the processing circuitry, a launch command to the external client device through the physical phone connector, the launch command directing the external client device to launch an authentication application which is constructed and arranged to receive the released secret from the processing circuitry for user authentication.

10. A method as in claim 2 wherein storing the initial secret in the local memory includes:
receiving the initial secret from an external secret deployment device through the physical phone connector and loading the received initial secret into the local memory;
wherein the initial secret includes a first secret share;
wherein the external client device includes authentication token circuitry which stores a second secret share; and
wherein electronically sending the released secret includes:
providing the first secret share to the authentication token circuitry of the external client device through the physical phone connector to provision the authentication token circuitry for passcode derivation using the first and second secret shares as input parameters.

11. A method as in claim 2 wherein storing the initial secret in the local memory includes:
receiving the initial secret from an external secret deployment device through the physical phone connector and loading the received initial secret into the local memory;
wherein the method further comprises the button press signal directing the processing circuitry to derive a one-time use passcode (OTP) based on the initial secret and output the OTP to the external client device through the physical phone connector.

12. An electronic apparatus to provide a secret to authenticate a user, the electronic apparatus comprising:
an audio jack;
memory; and
control circuitry coupled to the audio jack and the memory, the memory storing instructions which, when carried out by the control circuitry, cause the control circuitry to:
store an initial secret in the memory,
after the initial secret is stored in the memory, receive a release command, and
in response to the release command and based on the initial secret, output a released secret through the audio jack,
wherein the audio jack is a physical phone connector; and wherein the control circuitry, when outputting the released secret, is constructed and arranged to electronically send the released secret to an external client device through the physical phone connector,
wherein the control circuitry, when electronically sending the released secret to the external client device through the physical phone connector, is constructed and arranged to derive a one-time use passcode (OTP) based on the initial secret, and output, as the released secret, the OTP to the external client device through the physical phone connector,
wherein the control circuitry resides in a housing which is separate from the external client device; wherein the control circuitry is coupled to a physical button which is supported by the housing; and
wherein the instructions which cause the control circuitry to receive the release command further cause the control circuitry to receive a button press signal from the physical button in response to user actuation of the physical button, the button press signal directing the control circuitry to derive the OTP and output the OTP to the external client device through the physical phone connector.

13. An electronic apparatus as in claim 12 wherein the external client device includes a power source; and wherein control circuitry is further constructed and arranged to:
receive power from the power source of the external client device through the physical phone connector, the received power being later used by the processing circuitry to electronically send the released secret to the external client device through the physical phone connector.

14. An electronic apparatus as in claim 12 wherein the control circuitry, when storing the initial secret in the local memory, is constructed and arranged to:
receive the initial secret from an external secret deployment device through the physical phone connector and load the received initial secret into the local memory.

15. An electronic apparatus as in claim 12 wherein the control circuitry, when electronically sending the released secret, is constructed and arranged to:
transmit, as the released secret, at least a portion of the initial secret to the external client device through the physical phone connector.

16. A computer program product having a non-transitory computer readable medium which stores a set of instructions to provide a secret to authenticate a user, the set of instructions, when carried out by computerized circuitry, causing the computerized circuitry to perform a method of:
storing an initial secret in local memory;
after the initial secret is stored in the local memory, receiving a release command; and
in response to the release command and based on the initial secret, outputting a released secret through an audio jack which is coupled to the computerized circuitry, wherein the audio jack is a physical phone connector;
wherein outputting the released secret includes electronically sending the released secret to an external client device through the physical phone connector;
wherein electronically sending the released secret includes transmitting, as the released secret, at least a portion of the initial secret to the external client device through the physical phone connector;
wherein the initial secret includes a first secret share;
wherein the external client device includes authentication token circuitry which stores a second secret share; and
wherein transmitting includes providing the first secret share to the authentication token circuitry of the external client device through the physical phone connector to provision the authentication token circuitry for passcode derivation using the first and second secret shares as input parameters.

\* \* \* \* \*